US009014951B2

(12) United States Patent
Jang

(10) Patent No.: US 9,014,951 B2
(45) Date of Patent: Apr. 21, 2015

(54) METHOD AND SYSTEM FOR CORRECTING ENGINE TORQUE BASED ON VEHICLE LOAD

(71) Applicants: Hyundai Motor Company, Seoul (KR); Kia Motors Corporation, Seoul (KR)

(72) Inventor: Sung Hwan Jang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 207 days.

(21) Appl. No.: 13/717,099

(22) Filed: Dec. 17, 2012

(65) Prior Publication Data

US 2014/0046572 A1 Feb. 13, 2014

(30) Foreign Application Priority Data

Aug. 7, 2012 (KR) ........................ 10-2012-0086378

(51) Int. Cl.

*G06F 19/00* (2011.01)
*F02D 11/10* (2006.01)
*F02D 45/00* (2006.01)
*F02D 41/10* (2006.01)
*F02D 41/12* (2006.01)

(52) U.S. Cl.

CPC ................ *F02D 45/00* (2013.01); *F02D 41/10* (2013.01); *F02D 41/12* (2013.01); *F02D 11/105* (2013.01); *F02D 2250/21* (2013.01)

(58) Field of Classification Search

CPC .................... F02D 2200/1002; F02D 2250/18; F02D 45/00; F02D 41/04

USPC ................. 123/319, 681, 682, 492, 493, 486, 123/406.23, 406.25, 399, 436; 701/102, 54, 701/114, 110; 251/129.15

See application file for complete search history.

(56) References Cited

U.S. PATENT DOCUMENTS

| | | | | |
|---|---|---|---|---|
| 4,541,052 | A * | 9/1985 | McCulloch | 701/110 |
| 5,319,559 | A * | 6/1994 | Kusaka et al. | 701/110 |
| 5,557,519 | A * | 9/1996 | Morita | 701/1 |
| 5,906,185 | A * | 5/1999 | Ishida et al. | 123/399 |
| 6,236,929 | B1 * | 5/2001 | Sen et al. | 701/93 |
| 6,249,735 | B1 * | 6/2001 | Yamada et al. | 701/65 |

(Continued)

FOREIGN PATENT DOCUMENTS

| | | |
|---|---|---|
| JP | 05-149181 A | 6/1993 |
| JP | 06-017684 A | 1/1994 |

(Continued)

*Primary Examiner* — Lindsay Low
*Assistant Examiner* — George Jin
(74) *Attorney, Agent, or Firm* — Morgan, Lewis & Bockius LLP

(57) ABSTRACT

A method and a system for correcting an engine torque based on a vehicle load may include: determining whether a vehicle load determination condition is satisfied continuously for a predetermined maintaining time, determining an average engine torque for the predetermined maintaining time if the vehicle load determination condition is satisfied continuously, determining whether the average engine torque is larger than a predetermined engine torque, determining a ratio of the average engine torque and the predetermined engine torque if the average engine torque is larger than the predetermined engine torque, determining a correction factor using the ratio of the average engine torque and the predetermined engine torque, and determining the engine torque using the correction factor and a predetermined normal torque filter.

19 Claims, 5 Drawing Sheets

(56) References Cited

U.S. PATENT DOCUMENTS

| | | | | |
|---|---|---|---|---|
| 6,500,091 | B2 * | 12/2002 | Yeo | 477/97 |
| 6,879,902 | B2 * | 4/2005 | Nada | 701/93 |
| 7,480,545 | B2 * | 1/2009 | Braeuer et al. | 701/1 |
| 7,823,561 | B2 * | 11/2010 | Omuro et al. | 123/406.25 |
| 8,439,002 | B2 * | 5/2013 | Pursifull et al. | 123/21 |
| 2003/0209224 | A1 * | 11/2003 | Lee | 123/339.11 |
| 2005/0103309 | A1 * | 5/2005 | Nakagawa et al. | 123/350 |
| 2005/0137771 | A1 * | 6/2005 | Kwon | 701/51 |
| 2005/0216165 | A1 * | 9/2005 | Ito | 701/84 |
| 2007/0168106 | A1 * | 7/2007 | Takamatsu | 701/103 |
| 2008/0300768 | A1 * | 12/2008 | Hijikata | 701/102 |
| 2009/0164107 | A1 * | 6/2009 | Boumans et al. | 701/114 |
| 2010/0070159 | A1 * | 3/2010 | Iwahashi et al. | 701/105 |
| 2010/0262352 | A1 * | 10/2010 | Kuwahara et al. | 701/102 |
| 2011/0087418 | A1 * | 4/2011 | Wang et al. | 701/101 |
| 2011/0087421 | A1 * | 4/2011 | Soejima et al. | 701/102 |
| 2012/0053796 | A1 * | 3/2012 | Fleming et al. | 701/49 |
| 2013/0197775 | A1 * | 8/2013 | Szwabowski et al. | 701/101 |

FOREIGN PATENT DOCUMENTS

| | | | |
|---|---|---|---|
| JP | 2001-191821 | A | 7/2001 |
| KR | 10-2007-0060909 | A | 6/2007 |

* cited by examiner

METHOD AND SYSTEM FOR CORRECTING ENGINE TORQUE BASED ON VEHICLE LOAD

CROSS-REFERENCE TO RELATED APPLICATION

The present application claims priority to Korean Patent Application No. 10-2012-0086378 filed in the Korean Intellectual Property Office on Aug. 7, 2012, the entire contents of which is incorporated herein for all purposes by this reference.

BACKGROUND OF THE INVENTION

1. Field of the Invention

The present invention relates to a method and a system for correcting an engine torque based on a vehicle load, and more particularly to a method and a system for correcting an engine torque based on a vehicle load that can secure drivability to some degree under various vehicle loads when acceleration or deceleration.

2. Description of Related Art

Generally, an engine torque in a vehicle is controlled by controlling a fuel injection amount and an intake air amount depending on intention of a driver and the controlled engine torque is delivered to a driving wheel through a transmission. Therefore, the vehicle can be accelerated or decelerated according to acceleration intention or deceleration intention of the driver.

An accelerator pedal and a brake pedal for perceiving the acceleration intention or the deceleration intention of the driver are provided in the vehicle. If the driver has the acceleration intention, he or she pushes the accelerator pedal deeply. If the driver has the deceleration intention, he or she takes his or her foot off the accelerator pedal and pushes the brake pedal.

If the acceleration intention or the deceleration intention of the driver is transmitted to a control portion of the vehicle as described above (i.e., the accelerator pedal is pushed or the brake pedal is pushed), the control portion calculates a target engine torque according to the acceleration intention or deceleration intention of the driver. At this time, the control portion uses a predetermined torque map. After that, the control portion controls an engine according to the calculated target engine torque. That is, the control portion controls a fuel injection amount, an intake air amount, a fuel injection timing, and so on.

Meanwhile, if the engine torque is increased or reduced to the calculated target engine torque quickly, impact may occur. Therefore, drivability may be deteriorated. Therefore, the control portion uses a torque filter in order to increase or reduce the engine torque to the target engine torque slowly.

A conventional torque filter, however, is used assuming that a vehicle load is constant. Therefore, it is hard to secure favorable drivability under various vehicle loads when acceleration or deceleration. For example, if the conventional torque filter is used assuming the vehicle load is constant when a fully loaded truck or an overloaded bus is accelerated or decelerated, shock or jerk may occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system for correcting an engine torque based on a vehicle load having advantages of securing favorable drivability under various vehicle loads when acceleration or deceleration.

In an aspect of the present invention, a method for correcting an engine torque based on a vehicle load may include determining whether a vehicle load determination condition is satisfied continuously for a predetermined maintaining time, determining an average engine torque for the predetermined maintaining time when the vehicle load determination condition is satisfied continuously for the predetermined maintaining time, determining whether the average engine torque is larger than a predetermined engine torque, determining a ratio of the average engine torque and the predetermined engine torque when the average engine torque is larger than the predetermined engine torque, determining a correction factor using the ratio of the average engine torque and the predetermined engine torque, and determining the engine torque using the correction factor and a predetermined normal torque filter.

The predetermined normal torque filter may include a slope that increases or decreases the engine torque from a current engine torque to a target engine torque.

A region from the current engine torque to the target engine torque is divided into at least one subregion, wherein the predetermined normal torque filter is set at each subregion, and the correction factor is determined for each subregion.

The determining whether the vehicle load determination condition is satisfied may include determining whether a coolant temperature of an engine is within a predetermined coolant temperature range.

The determining whether the vehicle load determination condition is satisfied may include determining whether a clutch and a brake pedal are released.

The determining whether the vehicle load determination condition is satisfied may include determining whether a currently engaged shift-speed is higher than a predetermined shift-speed.

The determining whether the vehicle load determination condition is satisfied may include determining whether a position of an accelerator pedal is within a predetermined position range of the accelerator pedal.

The determining whether the vehicle load determination condition is satisfied may include determining whether a position change of an accelerator pedal is within a predetermined position change range of the accelerator pedal.

The determining whether the vehicle load determination condition is satisfied may include determining whether an engine speed is within a predetermined engine speed range.

The determining whether the vehicle load determination condition is satisfied may include determining whether an engine speed change is within a predetermined engine speed change range.

The determining whether the vehicle load determination condition is satisfied may include determining whether a vehicle speed change is within a predetermined vehicle speed change range.

The predetermined normal torque filter may include a deceleration normal torque filter and an acceleration normal torque filter.

The correction factor is set “0” when the vehicle load determination condition is not satisfied continuously for the predetermined maintaining time.

In another aspect of the present invention, a system for correcting an engine torque based on a vehicle load comprising a control portion adapted to control the engine torque in acceleration or deceleration based on a predetermined normal torque filter, wherein the control portion determines an average engine torque for a predetermined maintaining time for which a vehicle load determination condition is satisfied continuously, determines a correction factor according to a ratio of the average engine torque and a predetermined engine torque by comparing the determined average engine torque with the predetermined engine torque, and determines the engine torque using the determined correction factor and the predetermined normal torque filter.

The predetermined normal torque filter may include a slope that increases or decreases the engine torque from a current engine torque to a target engine torque.

A region from the current engine torque to the target engine torque is divided into at least one subregion, and wherein the predetermined normal torque filter is set at each subregion, and the correction factor is determined for each subregion.

The predetermined normal torque filter may include a deceleration normal torque filter and an acceleration normal torque filter.

The vehicle load determination condition is satisfied when a coolant temperature of an engine is within a predetermined coolant temperature range, when a clutch and a brake pedal are released, when a currently engaged shift-speed is higher than a predetermined shift-speed, when a position of an accelerator pedal is within a predetermined position range of the accelerator pedal, when a position change of the accelerator pedal is within a predetermined position change range of the accelerator pedal, when an engine speed is within a predetermined engine speed range, when an engine speed change is within a predetermined engine speed change range, and when a vehicle speed change is within a predetermined vehicle speed change range.

The correction factor is set “0” when the vehicle load determination condition is not satisfied continuously for the predetermined maintaining time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
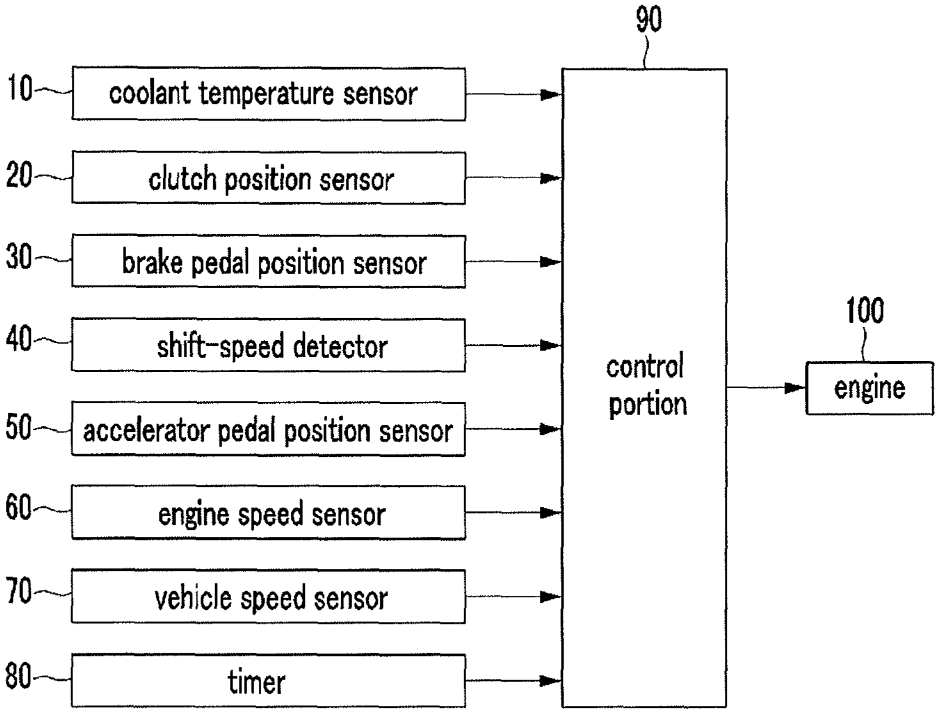
FIG. 1 is a block diagram of a system for correcting an engine torque based on a vehicle load according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a block diagram of a system for correcting an engine torque based on a vehicle load according to an exemplary embodiment of the present invention.

As shown in FIG. 1, a system for correcting an engine torque based on a vehicle load according to an exemplary embodiment of the present invention includes a coolant temperature sensor 10, a clutch position sensor 20, a brake pedal position sensor 30, a shift-speed detector 40, an accelerator pedal position sensor 50, an engine speed sensor 60, a vehicle speed sensor 70, a timer 80, a control portion 90, and an engine 100.

The coolant temperature sensor 10 detects a temperature of a coolant circulating through the engine 100 and transmits a signal corresponding thereto to the control portion 90.

The clutch position sensor 20 detects whether a clutch operates or not and transmits a signal corresponding thereto to the control portion 90. Whether the clutch operates or not can be detected by a switch.

The brake pedal position sensor 30 detects whether a brake pedal operates or not and transmits a signal corresponding thereto to the control portion 90. Whether the brake pedal operates or not can also be detected by a switch.

The shift-speed detector 40 detects a currently engaged shift-speed and transmits a signal corresponding thereto to the control portion 90. In a case of a manual transmission, if a position of a shift lever is detected, the currently engaged shift-speed can be detected. In addition, in a case of an automatic transmission, the currently engaged shift-speed can be detected if a ratio of an input speed and an output speed is detected. Also, the currently engaged shift-speed can be detected from a position of currently operated friction elements or vehicle speed and a position of the accelerator pedal. For example, shift-speeds which can be engaged may be first, second, third, fourth, fifth, and sixth forward speeds and a reverse speed in a six-speeds transmission.

The accelerator pedal position sensor 50 detects a position of an accelerator pedal and transmits a signal corresponding thereto to the control portion 90. The position of the accelerator pedal is related to an acceleration intention or a deceleration intention of a driver. If the accelerator pedal is pushed completely, the position value of the accelerator pedal may be 100%. If a driver never pushes the accelerator pedal, however, the position value of the accelerator pedal may be 0%. Instead of using the accelerator pedal position sensor 50, a throttle valve opening sensor that is mounted at an intake passage may be used. In this specification and claims, it is to be understood that the accelerator pedal position sensor 50 includes the throttle valve opening sensor.

The engine speed sensor 60 detects an engine speed from a phase change of a crankshaft and transmits a signal corresponding thereto to the control portion 90.

The vehicle speed sensor 70 is mounted at a wheel of the vehicle, detects a vehicle speed, and transmits a signal corresponding thereto to the control portion 90.

The timer 80 detects a duration time where any operation of the engine maintains and transmits a signal corresponding thereto to the control portion 90. In further detail, the timer 80 may detects the duration time where a load determination condition is satisfied.

The control portion 90 is electrically connected to the coolant temperature sensor 10, the clutch position sensor 20, the brake pedal position sensor 30, the shift-speed detector 40, the accelerator pedal position sensor 50, the engine speed sensor 60, the vehicle speed sensor 70, and the timer 80 and receives the values detected by sensors, the detector, and the timer as electrical signals. The control portion 90 can be realized by one or more processors activated by a predetermined program, and the predetermined program can be programmed to perform each step of a method for correcting an engine torque based on a vehicle load according to an exemplary embodiment of the present invention.

The control portion 90 controls an operation of the engine 100 (e.g., engine torque) based on the electrical signals received from the sensors, the detector, and the timer. Particularly, the control portion 90 controls the engine torque through control of fuel injection amount and fuel injection timing.

Hereinafter, a method for correcting an engine torque based on a vehicle load according to an exemplary embodiment of the present invention will be described in detail with reference to FIG. 2 and FIG. 3.

Figure 2:
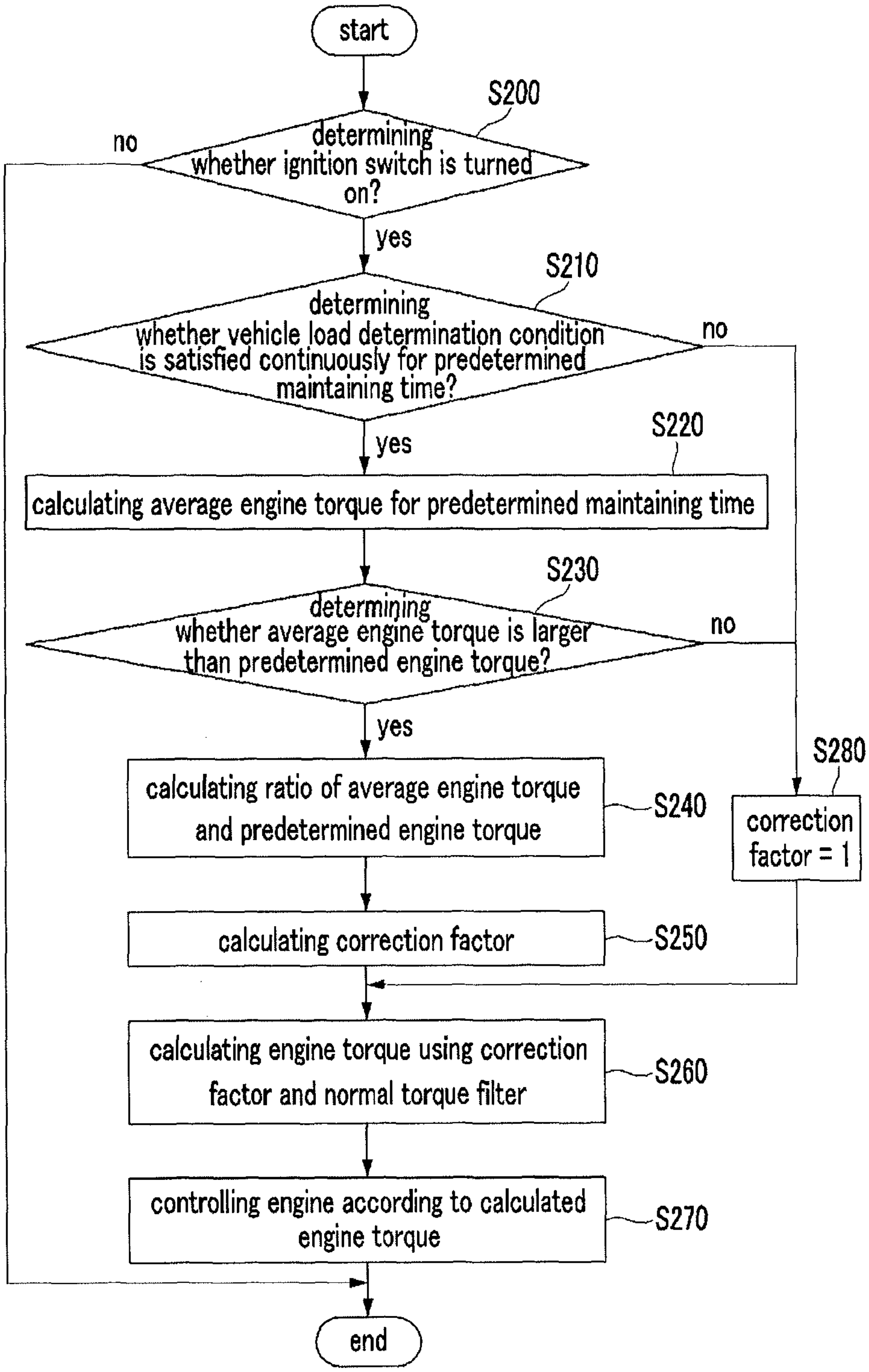
FIG. 2 is a flowchart of a method for correcting an engine torque based on a vehicle load according to an exemplary embodiment of the present invention.
Figure 3:
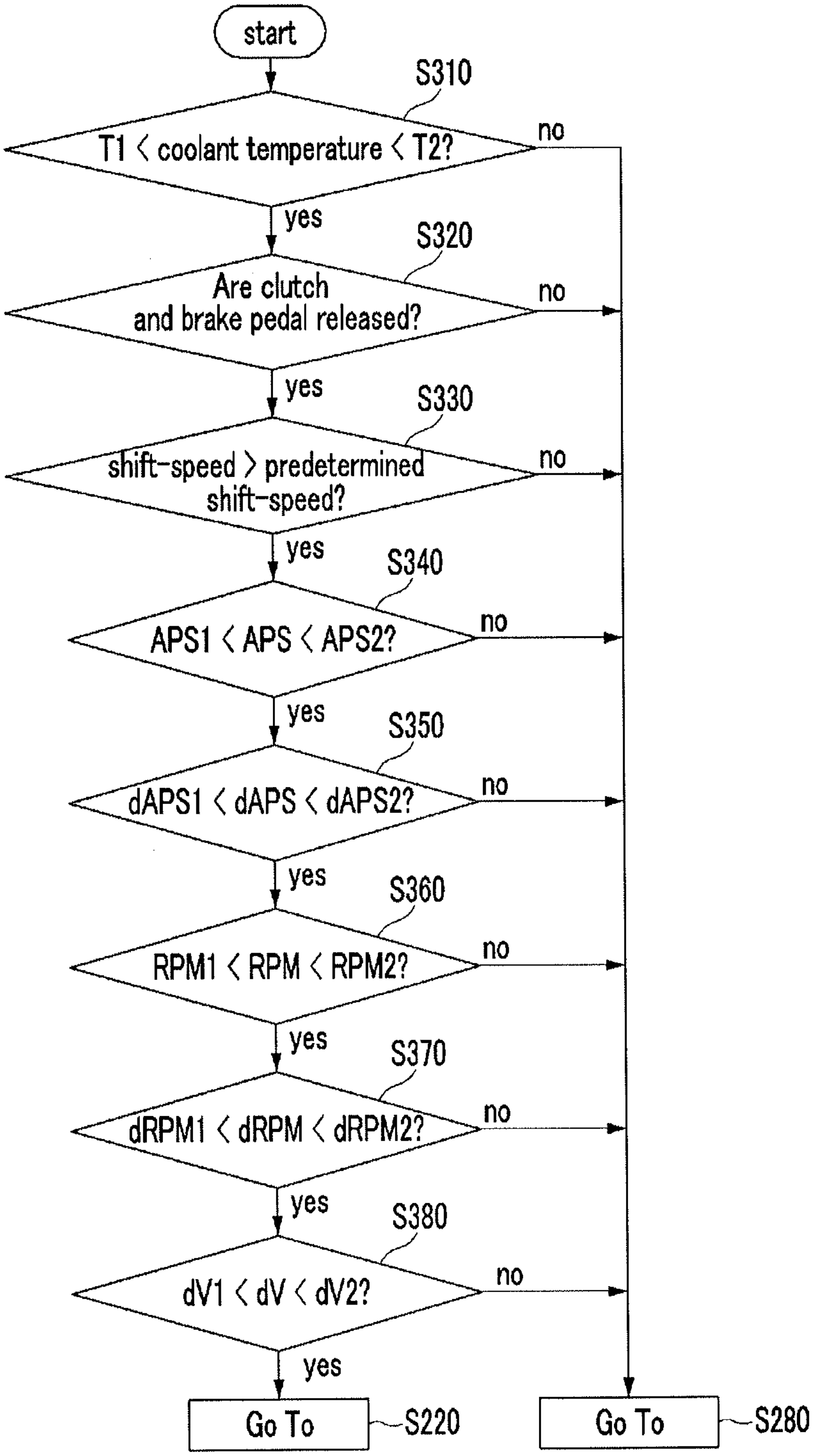
FIG. 3 is a detailed flowchart of step S210 in FIG. 2.

FIG. 2 is a flowchart of a method for correcting an engine torque based on a vehicle load according to an exemplary embodiment of the present invention, and FIG. 3 is a detailed flowchart of step S210 in FIG. 2.

As shown in FIG. 2, a method for correcting an engine torque based on a vehicle load according to an exemplary embodiment of the present invention is performed when an ignition switch is turned on. That is, the control portion 90 determines whether the ignition switch is turned on at step S200. If the ignition switch is turned off, the control portion 90 ends the method according to an exemplary embodiment of the present invention.

If the ignition switch is turned on, the control portion 90 determines whether the vehicle load determination condition is satisfied continuously for a predetermined maintaining time at step S210. Herein, the predetermined maintaining time may be 2.5 second.

The vehicle load determination condition includes a coolant temperature condition, a clutch and brake pedal condition, a shift-speed condition, an acceleration pedal position condition, an engine speed condition, and a vehicle speed condition.

Referring to FIG. 3, the step S210 will be described in detail.

The control portion 90 determines whether the coolant temperature condition is satisfied based on the signal received from the coolant temperature sensor 10 at step S310. In further detail, the control portion 90 determines whether a current coolant temperature is within a predetermined coolant temperature range (i.e., between a first coolant temperature T1 and a second coolant temperature T2). For example, the first coolant temperature T1 may be 80° C. and the second coolant temperature T2 may be 100° C.

If the coolant temperature condition is not satisfied, the control portion 90 proceeds to step S280.

If the coolant temperature condition, however, is satisfied, the control portion 90 determines whether the clutch and brake pedal condition is satisfied based on the signals received from the clutch position sensor 20 and the brake pedal position sensor 30 at step S320. In further detail, the control portion 90 determines whether the clutch and the brake pedal are released.

If the clutch and brake pedal condition is not satisfied, the control portion 90 proceeds to the step S280.

If the clutch and brake pedal condition, however, is satisfied, the control portion 90 determines whether the shift-speed condition is satisfied based on the signal received from the shift-speed detector 40 at step S330. In further detail, the control portion 90 determines whether a currently engaged shift-speed is higher than a predetermined shift-speed. The predetermined shift-speed may be a third forward speed.

If the shift-speed condition is not satisfied, the control portion 90 proceeds to the step S280.

If the shift-speed condition, however, is satisfied, the control portion 90 determines whether the accelerator pedal position condition is satisfied based on the signal received from the accelerator pedal position sensor 50 at steps S340 and S350. In further detail, the control portion 90 determines whether the position of the accelerator pedal is within a predetermined position range of the accelerator pedal (i.e., between a first accelerator pedal position APS1 and a second accelerator pedal position APS2), and determines whether a position change of the accelerator pedal is within a predetermined position change range of the accelerator pedal (between a first accelerator pedal position change dAPS1 and a second accelerator pedal position change dAPS2). The first accelerator pedal position APS1 may be 5% and the second accelerator pedal position APS2 may be 60%. In addition, the first accelerator pedal position change dAPS1 may be −1%/sec and the second accelerator pedal position change dAPS2 may be 1%/sec.

If the accelerator pedal position condition is not satisfied, the control portion 90 proceeds to the step S280.

If the accelerator pedal position condition, however, is satisfied, the control portion 90 determines whether the engine speed condition is satisfied based on the signal received from the engine speed sensor 60 at steps S360 and S370. In further detail, the control portion 90 determines whether the engine speed is within a predetermined engine speed range (i.e., between a first engine speed RPM1 and a second engine speed RPM2), and determines whether an engine speed change is within a predetermined engine speed change range (i.e., between a first engine speed change dRPM1 and a second engine speed change dRPM2). The first engine speed RPM1 may be 1250 RPM and the second engine speed RPM2 may be 3500 RPM. In addition, the first engine speed change dRPM1 may be −15 RPM/sec and the second engine speed change dRPM2 may be 15 RPM/sec.

If the engine speed condition is not satisfied, the control portion 90 proceeds to the step S280.

If the engine speed condition, however, is satisfied, the control portion 90 determines whether the vehicle speed condition is satisfied based on the signal received from the vehicle speed sensor 70 at step S380. In further detail, the control portion 90 determines whether a vehicle speed change is within a predetermined vehicle speed change range (between a first vehicle speed change dV1 and a second vehicle speed change dV2). The first vehicle speed change dV1 may be −1 KPH/sec and the second vehicle speed change dV2 may be 1 KPH/sec.

If the vehicle speed condition is not satisfied, the control portion 90 proceeds to the step S280. If the vehicle speed condition, however, is satisfied, the control portion 90 proceeds to step S220.

It is exemplified but is not limited to that the control portion 90 proceeds to the step S220 if all the coolant temperature condition, the clutch and brake pedal condition, the shift-speed condition, the acceleration pedal position condition, the engine speed condition, and the vehicle speed condition are satisfied in FIG. 3. It is to be understood that the case where more than one, two, or three among the coolant temperature condition, the clutch and brake pedal condition, the shift-speed condition, the acceleration pedal position condition, the engine speed condition, and the vehicle speed condition is satisfied is also included in the scope of the present invention.

If the vehicle load determination condition is satisfied continuously for the predetermined maintaining time at the step S210, the control portion 90 calculates an average engine torque for the predetermined maintaining time at step S220. The average engine torque is an average of the engine torque actually output for the predetermined maintaining time. That is, the control portion 90 records the engine torque at each time and calculates the average engine torque based on the records of the engine torque.

After that, the control portion 90 determines whether the average engine torque is larger than a predetermined engine torque at step S230. The predetermined engine torque is set according to the shift-speed and the engine speed. Herein, the predetermined engine torque is the engine torque necessary to maintain the vehicle speed to be constant, and is set under a condition assuming the vehicle load is constant. Therefore, if the average engine torque is larger than the predetermined engine torque, it indicates the vehicle load is larger than the assumed vehicle load and the engine torque should be corrected.

If the average engine torque is larger than the predetermined engine torque, the control portion 90 calculates a ratio of the average engine torque and the predetermined engine torque (the average engine torque/the predetermined engine torque) at step S240. After that, the control portion 90 calculates a correction factor according to the ratio of the average engine torque and the predetermined engine torque at step S250. The correction factor according to the average engine torque and the predetermined engine torque are exemplified in the following table.

termined under constant vehicle load condition. In addition, a region from the current engine torque to the target engine torque is divided into at least one subregion, and the normal torque filter and the correction factor are set at each subregion. It is exemplified in this specification but is not limited to that the region from the current engine torque to the target engine torque is divided into three subregions.

Figure 4:
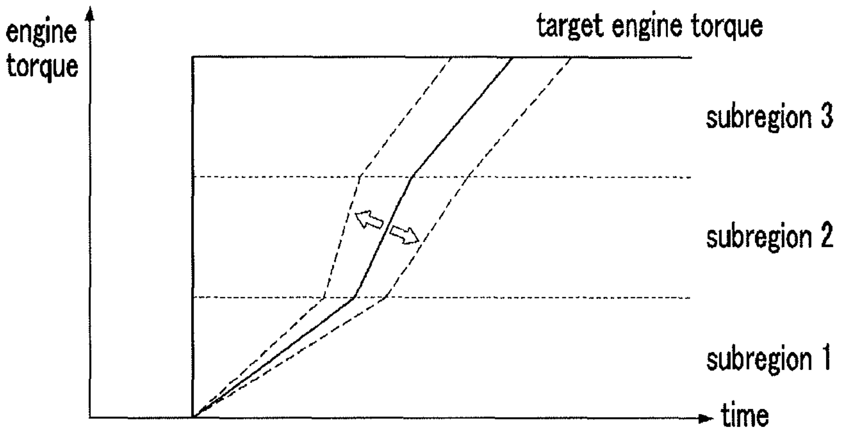
FIG. 4 is a graph of a normal torque filter and a corrected torque filter when acceleration.
Figure 5:
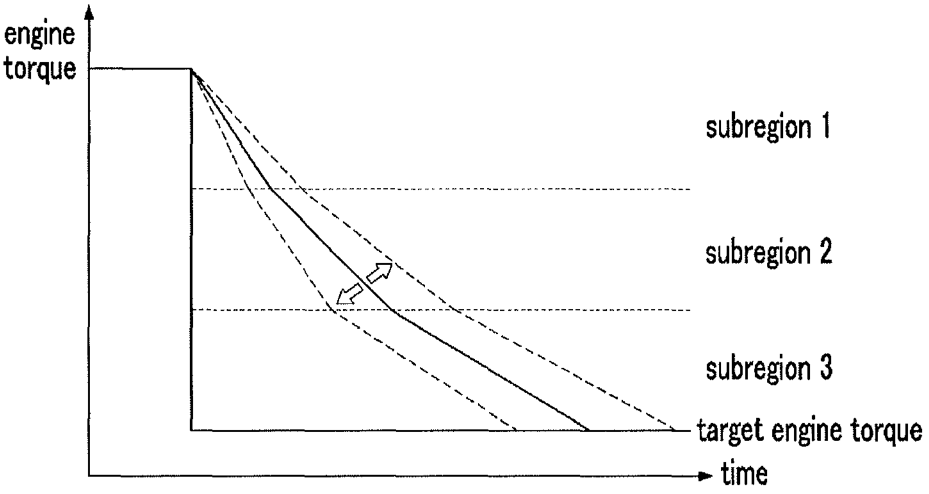
FIG. 5 is a graph of a normal torque filter and a corrected torque filter when deceleration.

For example, when the engine torque is increased to the target engine torque, the engine torque is increased by the slope determined according to a first filter value of the normal torque filter and a first correction factor (the normal torque filter and the correction factor determined at a subregion1) at the subregion1, is increased by the slope determined according to a second filter value of the normal torque filter and a second correction factor (the normal torque filter and the correction factor determined at a subregion2) at the subregion2, and is increased by a slope determined according to a third filter value of the normal torque filter and the third correction factor (the normal torque filter and the correction factor determined at a subregion3) at the subregion3 (referring to FIG. 4 and FIG. 5).

After that the correction factor is calculated at the step S250, the control portion 90 calculates the engine torque using the correction factor and the normal torque filter at step S260. In further detail, the control portion 90 determines the slope of the engine torque using the correction factor and the normal torque filter and the slope of the engine torque is calculated at each subregion.

After that, the control portion 90 controls the engine 100 according to the calculated engine torque.

Meanwhile, the determination result at the step S210 and the step S230 is 'no', the control portion 90 proceeds to the step S280. That is, the control portion 90 substitutes '1' for the correction factor. That is, the engine 100 is controlled according to the normal torque filter.

FIG. 4 is a graph of a normal torque filter and a corrected torque filter when acceleration, and FIG. 5 is a graph of a normal torque filter and a corrected torque filter when deceleration. A solid line represents the normal torque filter and a dotted line represents the corrected torque filter in FIG. 4 and FIG. 5.

As shown in FIG. 4 and FIG. 5, the engine torque is increased or decreased to the target engine torque not quickly but through three subregions.

According to a conventional engine torque control, the engine torque is increased or decreased by a constant slop at each subregion regardless of the vehicle load if the current engine torque and the target engine torque are determined. According to an exemplary embodiment of the present invention, however, the average engine torque is calculated according to the vehicle load, the correction factor is calculated according to the ratio of the average engine torque and the predetermined engine torque, and the engine torque is controlled according to the correction factor and the normal torque filter. Therefore, shock or jerk may be prevented.

TABLE

| | | 1 < ratio ≤ X1 | X1 < ratio ≤ X2 | X2 < ratio ≤ X3 | X3 < ratio ≤ X4 | X4 < ratio |
|---|---|---|---|---|---|---|
| Acceleration | subregion1 | A1 | A2 | A3 | A4 | A5 |
| | subregion2 | B1 | B2 | B3 | B4 | B5 |
| | subregion3 | C1 | C2 | C3 | C4 | C5 |
| Deceleration | subregion1 | D1 | D2 | D3 | D4 | D5 |
| | subregion2 | E1 | E2 | E3 | E4 | E5 |
| | subregion3 | F1 | F2 | F3 | F4 | F5 |

As shown in the Table, the correction factor when acceleration and the correction factor when deceleration are set respectively. The correction factor is used for correcting the normal torque filter, and the normal torque filter is related to a slope that increases or decreases the engine torque from a current engine torque to a target engine torque and is prede- As described above, the engine torque may be calculated according to the actual vehicle load condition by calculating the average engine torque operating the vehicle under various vehicle loads and reflecting the ratio of the average engine torque and the predetermined engine torque on the correction factor according to an exemplary embodiment of the present invention. Therefore, shock or jerk may be prevented.

In addition, favorable drivability may be secured under various vehicle loads when acceleration or deceleration by correcting the torque filter according to the vehicle load.

Further, responsiveness in acceleration or deceleration may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for correcting an engine torque based on a vehicle load, comprising:

determining, by a control portion, whether a vehicle load determination condition is satisfied continuously for a predetermined maintaining time;

determining, by the control portion, an average engine torque for the predetermined maintaining time when the vehicle load determination condition is satisfied continuously for the predetermined maintaining time;

determining, by the control portion, whether the average engine torque is larger than a predetermined engine torque;

determining, by the control portion, a ratio of the average engine torque and the predetermined engine torque when the average engine torque is larger than the predetermined engine torque;

determining, by the control portion, a correction factor using the ratio of the average engine torque and the predetermined engine torque;

determining, by the control portion, the engine torque using the correction factor and a predetermined normal torque filter; and controlling by the control portion, an engine according to the determined engine torque.

2. The method of claim 1, wherein the predetermined normal torque filter includes a slope that increases or decreases the engine torque from a current engine torque to a target engine torque.

3. The method of claim 2, wherein a region from the current engine torque to the target engine torque is divided into at least one subregion, and wherein the predetermined normal torque filter is set at each subregion, and the correction factor is determined for each subregion.

4. The method of claim 1, wherein the determining whether the vehicle load determination condition is satisfied includes determining whether a coolant temperature of an engine is within a predetermined coolant temperature range.

5. The method of claim 1, wherein the determining whether the vehicle load determination condition is satisfied includes determining whether a clutch and a brake pedal are released.

6. The method of claim 1, wherein the determining whether the vehicle load determination condition is satisfied includes determining whether a currently engaged shift-speed is higher than a predetermined shift-speed.

7. The method of claim 1, wherein the determining whether the vehicle load determination condition is satisfied includes determining whether a position of an accelerator pedal is within a predetermined position range of the accelerator pedal.

8. The method of claim 1, wherein the determining whether the vehicle load determination condition is satisfied includes determining whether a position change of an accelerator pedal is within a predetermined position change range of the accelerator pedal.

9. The method of claim 1, wherein the determining whether the vehicle load determination condition is satisfied includes determining whether an engine speed is within a predetermined engine speed range.

10. The method of claim 1, wherein the determining whether the vehicle load determination condition is satisfied includes determining whether an engine speed change is within a predetermined engine speed change range.

11. The method of claim 1, wherein the determining whether the vehicle load determination condition is satisfied includes determining whether a vehicle speed change is within a predetermined vehicle speed change range.

12. The method of claim 1, wherein the predetermined normal torque filter includes a deceleration normal torque filter and an acceleration normal torque filter.

13. The method of claim 1, wherein the correction factor is set "0" when the vehicle load determination condition is not satisfied continuously for the predetermined maintaining time.

14. A system for correcting an engine torque based on a vehicle load comprising a control portion configured to control the engine torque in acceleration or deceleration based on a predetermined normal torque filter, wherein the control portion determines an average engine torque for a predetermined maintaining time for which a vehicle load determination condition is satisfied continuously, determines a correction factor according to a ratio of the average engine torque and a predetermined engine torque by comparing the determined average engine torque with the predetermined engine torque, and determines the engine torque using the determined correction factor and the predetermined normal torque filter, and wherein the control portion controls an engine according to the determined engine torque.

15. The system of claim 14, wherein the predetermined normal torque filter includes a slope that increases or decreases the engine torque from a current engine torque to a target engine torque.

16. The system of claim 15, wherein a region from the current engine torque to the target engine torque is divided into at least one subregion, and wherein the predetermined normal torque filter is set at each subregion, and the correction factor is determined for each subregion.

17. The system of claim 14, wherein the predetermined normal torque filter includes a deceleration normal torque filter and an acceleration normal torque filter.

18. The system of claim 14, wherein the vehicle load determination condition is satisfied when a coolant temperature of an engine is within a predetermined coolant temperature range, when a clutch and a brake pedal are released, when a currently engaged shift-speed is higher than a predetermined shift-speed, when a position of an accelerator pedal is within a predetermined position range of the accelerator pedal, when a position change of the accelerator pedal is within a predetermined position change range of the accelerator pedal, when an engine speed is within a predetermined engine speed range, when an engine speed change is within a predetermined engine speed change range, and when a vehicle speed change is within a predetermined vehicle speed change range.

19. The system of claim 14, wherein the correction factor is set "0" when the vehicle load determination condition is not satisfied continuously for the predetermined maintaining time.

* * * * *